No. 807,631. PATENTED DEC. 19, 1905.
H. MIKOREY.
CHEMICAL FIRE EXTINGUISHER.
APPLICATION FILED NOV. 17, 1904.
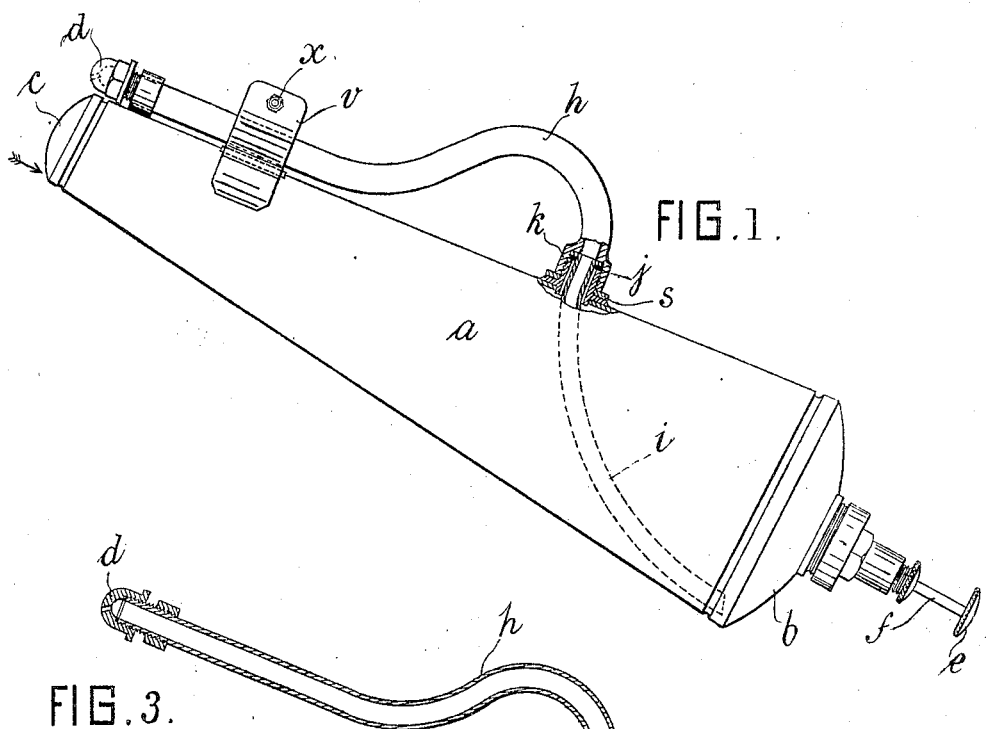
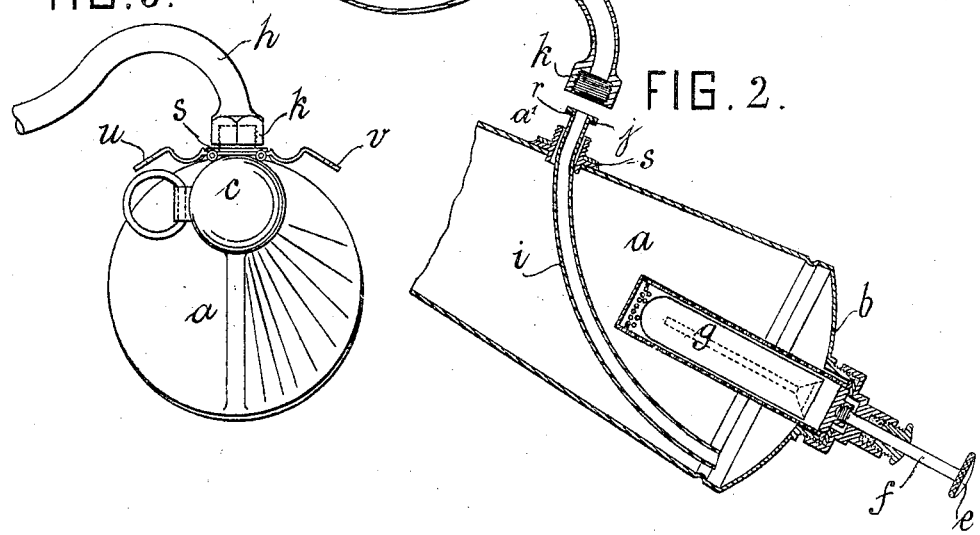

UNITED STATES PATENT OFFICE.

HANS MIKOREY, OF SCHONEBERG, NEAR BERLIN, GERMANY, ASSIGNOR TO THE FIRM OF W. GRAFF & COMPANY GESELLSCHAFT MIT BESCHRÄNKTER HAFTUNG, OF BERLIN, GERMANY.

CHEMICAL FIRE-EXTINGUISHER.

No. 807,631.    Specification of Letters Patent.    Patented Dec. 19, 1905.

Application filed November 17, 1904. Serial No. 233,226.

*To all whom it may concern:*

Be it known that I, HANS MIKOREY, a subject of the German Emperor, residing at 13 Wartburgstrasse, Schöneberg, near Berlin, in the German Empire, have invented a new and useful Improved Chemical Fire-Extinguisher, of which the following is a specification.

This invention relates to a hand-operated chemical fire-extinguisher of that known type in which the liquid to be ejected by means of carbonic acid constitutes the filling of a receptacle, which has, in addition to a handle, an ejecting-nozzle and a vessel containing the carbonic acid. The latter is adapted to be broken into pieces by depressing an external button, and the resulting production of gas directly effects the ejection of the filling or contents of the receptacle through the opening in the nozzle, in connection with a discharge-tube extending to the bottom of the receptacle. The reliable function of the fire-extinguisher materially depends on the condition of this discharge-tube. In so far as the latter is always contained in the filling liquid and also firmly located in an inaccessible position within the receptacle, it is not unlikely that from some reason or other—as, for instance, in consequence of the rotting of the material—obstructions or also holes may be formed in the receptacle and remain unnoticed, whereby the danger would arise that the fire-extinguisher when about to be used would fail to act, notwithstanding the danger of bursting. In order to obviate this drawback, the discharge-tube, according to the present invention, is made interchangeable and regulable, so far as its properties are concerned. It is also arranged in such a manner that it is loosely connected, by means of a tube-coupling, to a tubular handle, which is also a detachable part of the fire-extinguisher and forms an extension of the discharge-tube, including the ejecting-nozzle.

Reverting to the accompanying drawings, which show a constructional form of the invention, by way of example, Figure 1 is a side elevation of the fire-extinguisher. Fig. 2 is a partial sectional view with tubular handle and ejecting-tube shown separately; and Fig. 3 is a view as seen from the front of the fire-extinguisher in the direction of the arrow, Fig. 1, the tubular handle being turned transversely and shown in a broken-off state, whereas the fastening means for the handle are shown in the form of foldable clips.

The receptacle $a$ is preferably of a conical shape. The destroying means, which comprise the piston $f$ with push-putton $e$, are screwed to the bottom $b$ of the receptacle and act on the carbonic-acid vessel $g$ within the receptacle. The receptacle $a$ is closed at the other front end by a lid or cover $c$. The improvement consists in the arrangement of the inner discharge-tube $i$, connected to an ejecting-tube $h$ in the form of a handle. It is not provided along the sides of the receptacle or fixed to the receptacle $a$ in an inaccessible position, but it is arranged as a detachable element, in that it extends to a securing-socket $a'$ and permits a corresponding packing-flange $j$ to be screwed thereto. When the fire-extinguisher is properly mounted, the inner injecting end of the discharge-tube $i$ is located next to the side of the receptacle which is opposite to the screw-fitting and is directed toward the bottom $b$, as shown in dotted lines in Fig. 1. Owing to this position of the end of the discharge-tube, the filling or contents of the receptacle can be completely ejected, notwithstanding the operative position of the receptacle to be established by the handle $h$.

The ejecting-nozzle $d$ is connected to the tubular handle $h$ and is directed with an obliquely-bored ejecting-opening near the front end of the receptacle at $c$ toward the averted side of the handle $h$. The bent tube of the handle forms a direct extension of the discharge-tube $i$ in that it is connected by means of the tube-coupling to the flanged (at $j$) end of this tube, so as to be also in connection with the receptacle proper. According to the construction shown, by way of example, the tube $h$ of the handle has a coupling part directly on a screw-threaded cap $k$. This cap screws over the socket $a'$ in the side of the receptacle and permits the tight-screwing connection of the flange $j$ of the tube $i$ with the aid of suitable packing-rings $r\ s$. As the leg of the tube $h$ supports the nozzle $d$ and is directed aside, it also constitutes a convenient means (instead of a key) for screwing and unscrewing the coupling connection. In the firmly-screwed position, Fig. 1, the tube $h$ of the handle is prevented from becoming loose by means of a suitable fastening device, and the adjustment of the nozzle is also thereby insured. Fig. 3 shows that two laterally-foldable parts $u$ $v$, hinged to the side of the receptacle, may serve as fastening means for the said purpose. These parts when folded together, Fig. 1, are capable of receiving and securing the tube $h$ between them, while a screw-bolt $x$ is employed for the reciprocal connection. If, however, the parts of the fastening-clips $u$ $v$ are turned up, as shown in Fig. 3, the turning aside of the tube $h$ and loosening of the screw connection at $j$ $k$ is rendered possible.

As soon as the tube $h$ of the handle is screwed off the discharge-tube $i$ can be freely taken out or drawn through the socket $a'$. Thus the control over the condition of the discharge-tube, especially the discharging part, is insured and the necessity for repairing or replacing this discharge-tube can be ascertained at any time. The removed tube $h$, with nozzle $d$, can also be easily examined and cleaned if necessary. Consequently this is a guarantee that the fire-extinguisher can be always ready for use.

The tube $h$ of the handle may be socketed at $x$, so that it can be seen whether the parts have been unscrewed.

The invention proper is not confined to the conical shape of the receptacle $a$ or to the special arrangement and construction of the destroying device $e$ $f$ $g$.

Having now particularly described and ascertained the nature of my said invention and in what manner the same is to be performed, I declare that what I claim, and wish to secure by Letters Patent, is—

1. A fire-extinguisher comprising a receptacle having an opening in its side, an internal tube projecting through said opening and loosely attached to the side of the receptacle, and an external tube detachably engaging the projecting end of said internal tube and provided with a nozzle on its free end, substantially as described.

2. A fire-extinguisher comprising a receptacle having an opening in its side, an internal tube projecting through said opening and loosely attached to the side of the receptacle, a tubular handle provided with a nozzle on one of its ends and having its other end detachably engaging the projecting end of the internal tube, substantially as described.

3. A fire-extinguisher comprising a receptacle having an opening in its side, an internal tube projecting through said opening and loosely attached to the side of the receptacle for removal from the receptacle, a tubular handle having one of its ends detachably engaging the projecting end of the internal tube, a nozzle on the free end of said handle, and detachable means for securing the free end of the handle to the receptacle, substantially as described.

In testimony whereof I have signed my name to this specification in the presence of two subscribing witnesses.

HANS MIKOREY.

Witnesses:
 HENRY HASPER,
 WOLDEMAR HAUPT.